(12) United States Patent
Gorkin et al.

(10) Patent No.: US 12,737,997 B2
(45) Date of Patent: Sep. 15, 2026

(54) GENERATING LIP SYNC AUGMENTED REALITY EFFECTS

(71) Applicant: Snap Inc., Santa Monica, CA (US)

(72) Inventors: Leonid Gorkin, Chappaqua, NY (US); Matthew Mahar, San Francisco, CA (US); Hanbo Chen, Kirkland, WA (US); Dmytro Barbaruk, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 241 days.

(21) Appl. No.: 18/609,960

(22) Filed: Mar. 19, 2024

(65) Prior Publication Data

US 2025/0299449 A1 Sep. 25, 2025

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01); *G06T 2219/2016* (2013.01)

(58) Field of Classification Search
CPC .............................. G06T 19/006; G06T 19/20
See application file for complete search history.

(56) References Cited

U.S. PATENT DOCUMENTS 10,242,477 B1 3/2019 Charlton et al.
10,432,559 B2 10/2019 Baldwin et al.
10,467,792 B1 11/2019 Roche et al.
10,770,092 B1 9/2020 Adams et al.
10,788,900 B1 9/2020 Brendel et al.
11,468,883 B2 10/2022 Ribas Machado et al.
2002/0097380 A1* 7/2002 Moulton .............. G11B 27/022 704/E21.02
2002/0194006 A1 12/2002 Challapali
2003/0050778 A1 3/2003 Nguyen et al.
2006/0143569 A1 6/2006 Kinsella et al.
2008/0120258 A1 5/2008 Shin et al.
2010/0141662 A1 6/2010 Storey et al.
2010/0332229 A1* 12/2010 Aoyama ................ G09B 19/04 704/251

(Continued)

FOREIGN PATENT DOCUMENTS

CN 107977928 5/2018
CN 110136216 8/2019

(Continued)

OTHER PUBLICATIONS

“2D Animated TTS”, [Online]. Retrieved from the Internet: <URL: https://docs.snap.com/lens-studio/references/templates/audio/2d-animated-tts#guide>, (Accessed Mar. 19, 2024), 17 pgs.

(Continued)

*Primary Examiner* — Charles Tseng
(74) *Attorney, Agent, or Firm* — Schwegman Lundberg & Woessner, P.A.

(57) ABSTRACT

An audio track with vocals is played back using a device with a display screen that displays a video feed from a camera. A location of a mouth depicted in the video feed is detected. A timestamp of playback of the audio track is compared to viseme-timestamp data for the audio track to identify a viseme corresponding to the timestamp of the audio playback. A viseme is positioned at the detected location of the mouth in the video feed.

20 Claims, 11 Drawing Sheets

(56) References Cited

U.S. PATENT DOCUMENTS

| | | | |
|---|---|---|---|
| 2012/0130717 A1 | 5/2012 | Xu et al. | |
| 2013/0307856 A1 | 11/2013 | Keane et al. | |
| 2015/0100537 A1 | 4/2015 | Grieves et al. | |
| 2016/0012853 A1 * | 1/2016 | Cabanilla ......... | G11B 20/10527 386/241 |
| 2016/0292148 A1 | 10/2016 | Aley et al. | |
| 2017/0154314 A1 | 6/2017 | Mones et al. | |
| 2017/0300462 A1 | 10/2017 | Cudworth et al. | |
| 2018/0083898 A1 | 3/2018 | Pham | |
| 2018/0113587 A1 | 4/2018 | Allen et al. | |
| 2018/0136794 A1 | 5/2018 | Cassidy et al. | |
| 2018/0210874 A1 | 7/2018 | Fuxman et al. | |
| 2018/0253881 A1 | 9/2018 | Edwards et al. | |
| 2018/0253895 A1 | 9/2018 | Arumugam | |
| 2020/0106728 A1 | 4/2020 | Grantham et al. | |
| 2020/0125322 A1 | 4/2020 | Wilde | |
| 2020/0175061 A1 | 6/2020 | Penta et al. | |
| 2021/0192800 A1 | 6/2021 | Dutta et al. | |
| 2021/0335350 A1 | 10/2021 | Ribas Machado Das Neves et al. | |
| 2021/0385179 A1 | 12/2021 | Heikkinen et al. | |
| 2022/0012929 A1 | 1/2022 | Blackstock et al. | |
| 2022/0019747 A1 | 1/2022 | Guo et al. | |
| 2022/0109646 A1 | 4/2022 | Lakshmipathy | |
| 2022/0284884 A1 | 9/2022 | Tongya | |
| 2024/0062008 A1 | 2/2024 | Ghosh et al. | |
| 2024/0104789 A1 | 3/2024 | Ghosh et al. | |

FOREIGN PATENT DOCUMENTS

| | | |
|---|---|---|
| CN | 110163220 | 8/2019 |
| CN | 110554782 | 12/2019 |
| CN | 114187405 | 3/2022 |
| KR | 20060125333 | 12/2006 |
| KR | 20200095781 | 8/2020 |
| WO | 2021137942 | 7/2021 |
| WO | 2023137557 | 7/2023 |
| WO | 2024039957 | 2/2024 |
| WO | 2024064806 | 3/2024 |

OTHER PUBLICATIONS

Huggins-Daines, David, "GitHub—cmusphinx/pocketsphinx: A small speech recognizer", [Online]. Retrieved from the Internet: <URL: https://github.com/cmusphinx/pocketsphinx/releases>, (Accessed Jan. 10, 2024), 5 pgs.

Moussallam, Manuel, "Releasing Spleeter: Deezer Research source separation engine", [Online]. Retrieved from the Internet: <URL: https://deezer.io/releasing-spleeter-deezer-r-d-source-separation-engine-2b88985e797e>, (Nov. 4, 2019), 9 pgs.

Zhou, Yang, et al., "VisemeNet: Audio-Driven Animator-Centric Speech Animation", ACM Transactions on Graphics, vol. 37, No. 4, Article 161, (Aug. 2018), 10 pgs.

Vougioukas, Konstantinos, "End-to-End Speech-Driven Facial Animation with Temporal GANs", arXiv:1805.09313v4 [eess.AS], (Jul. 19, 2018), 14 pgs.

Wang, Xingyao, "An animated picture says at least a thousand words: Selecting Gif-based Replies in Multimodal Dialog", arxiv.org, Cornell University Library, 201 Olin Library Cornell University Ithaca, NY 14853, (Sep. 24, 2021), 30 pgs.

"International Application Serial No. PCT US2025 015704, International Search Report mailed Jun. 12, 2025", 3 pgs.

"International Application Serial No. PCT US2025 015704, Written Opinion mailed Jun. 12, 2025", 5 pgs.

* cited by examiner

GENERATING LIP SYNC AUGMENTED REALITY EFFECTS

TECHNICAL FIELD

The present disclosure relates to augmented reality effects applied to a video feed including a face, and more particularly to providing facial expressions to a face represented in the video feed in conjunction with an audio track being played back.

BACKGROUND

Interaction system applications provide a vehicle for the sharing of user content such as photos or videos. In some instances, the photos or videos may be supplemented by augmented reality (AR) or other effects that are generated live on a camera feed and displayed on the display of a mobile device for preview. The user may be able to select and manipulate effects to apply to the live camera feed and, when satisfied, capture an image or record a video including the effects. The captured video or photo can then be shared on the interaction platform with a user's contacts and friends. In some examples, augmented reality effects may also be applied to live or captured video streams to provide an interaction between a user and their "friends" on the platform, or to provide an interactive solo experience.

AR effects, comprising various image processing operations corresponding to an image modification, filter, media overlay, transformation, and the like, can be used to provide such interactions and video stream modification techniques. In some examples, these image processing operations provide an interactive experience of a real-world environment, where objects, surfaces, backgrounds, lighting, and so forth in the real world are enhanced by computer-generated perceptual information. An AR effect comprises the collection of data, parameters, and other assets needed to apply a selected AR experience to an image or a video feed.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Singing along to a favorite song is a common practice. Lip-synching to a song while capturing a video of the performance is fun, but difficult to achieve unless the user knows the lyrics and timing well. This is particularly true for new songs, as opposed to old favorites. Disclosed herein are methods and systems for providing lip-synching by a user in a video feed, which may be used just as a sing-along, or for capture and forwarding.

This functionality is provided by animating the user's face (and lips in particular) in a video stream along with a song being played, based on a song-specific data file comprising viseme identifiers and corresponding time stamps. The viseme identifiers and timestamps define which user expression to use, and when, to lip-synch the user's appearance to the lyrics of the song. The animation of the user's face in some examples is a graphical manipulation of the appearance of the user's face as such, while in other examples an overlay or other image manipulation can be provided.

Song lyrics, while written as text, are sung as a sequence of phonemes. Phonemes are the smallest units of sound in a language that can distinguish words from one another. Phonemes are the basic building blocks of spoken language and are used to convey meaning. Phonemes are distinct from letters or graphemes, which represent the written form of language.

Each phoneme is associated with a corresponding viseme. Visemes are visual units of speech, corresponding to the different shapes and movements of the mouth and face when producing specific speech sounds. Visemes are concerned with the visual aspects of speech, particularly the lip and facial movements associated with different sounds. To a large extent, visemes are language-independent, so that sounds in any language can often be represented by the same visemes.

The number of visemes can vary depending on the language and the specific context of analysis. In general, the concept of visemes is used to group together similar lip and facial movements associated with certain phonemes. In English, ten to fifteen visemes adequately represent the visual aspects of speech. However, the exact number may vary, and some systems use fewer or more viseme categories.

To implement lip-synching on any song as described in more detail below, it is necessary to analyze songs to generate a time series of viseme identifiers, which are then provided to an application that recognizes a human face in a video stream, and applies a visual effect to the video stream based on the viseme identifier, at the appropriate time in the song based on the timestamp of the viseme identifier and at the appropriate location in the video stream, namely corresponding to the user's lower face and lips in particular.

Networked Computing Environment

Figure 1:
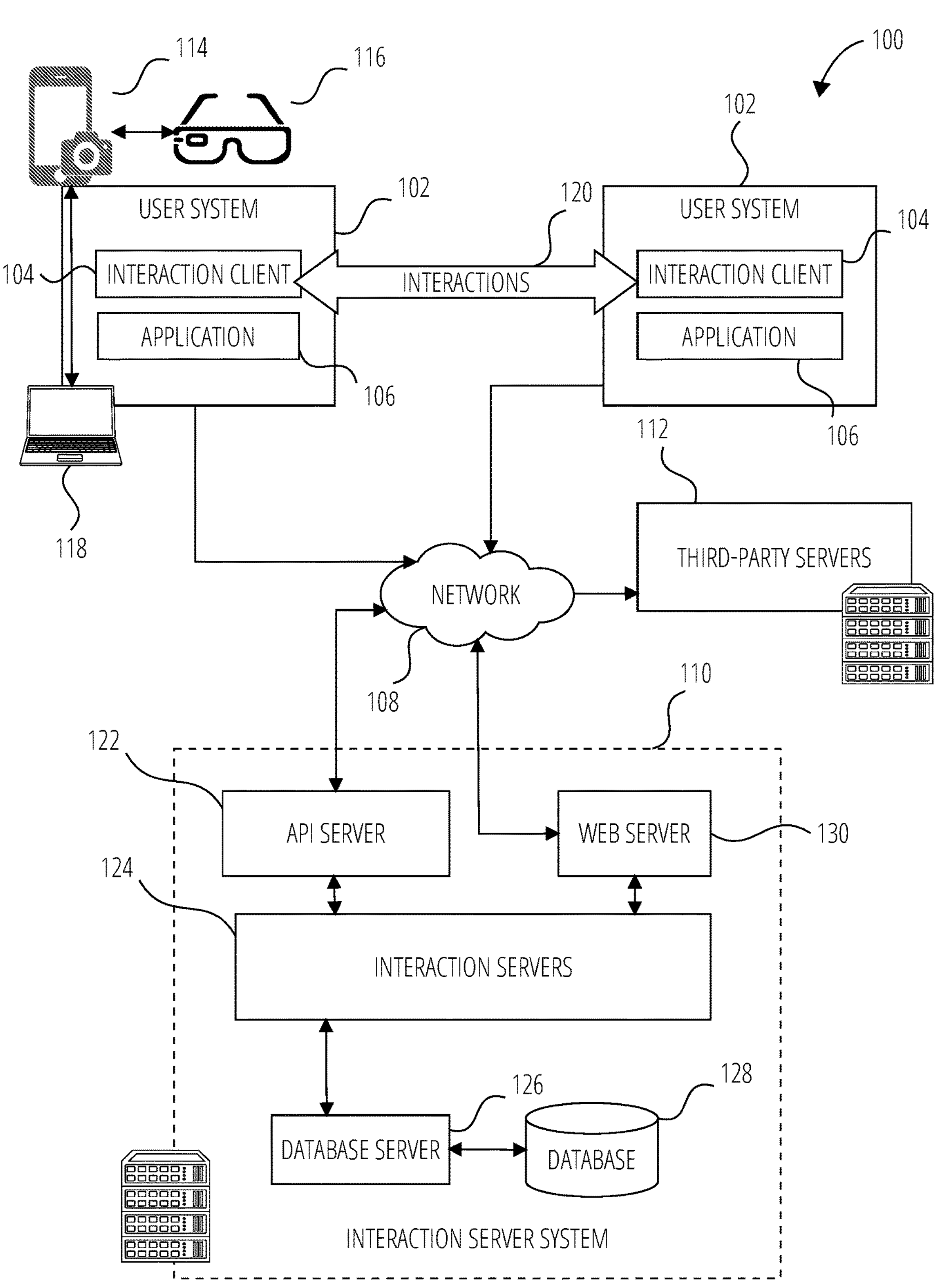
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
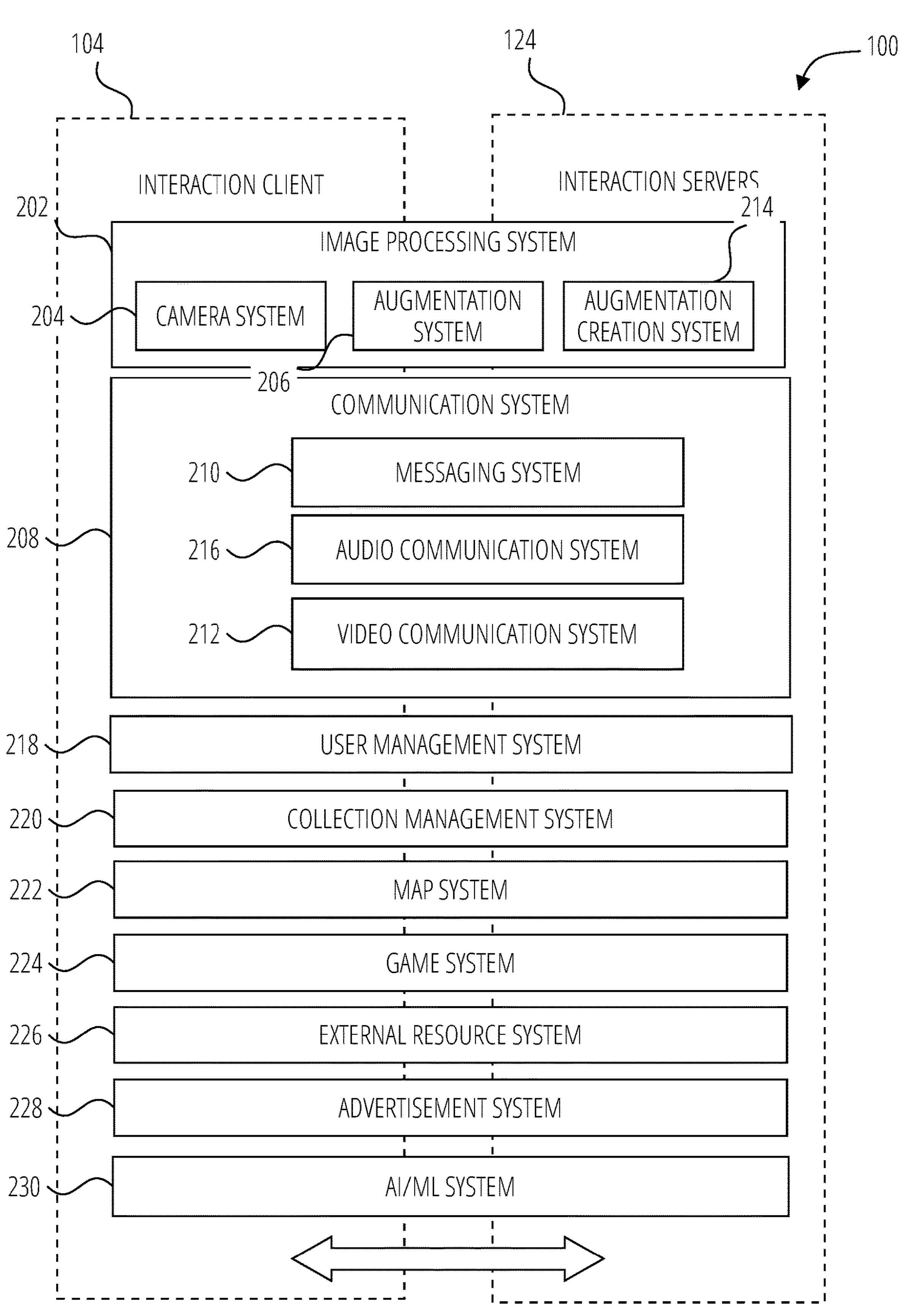
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 906 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice Beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
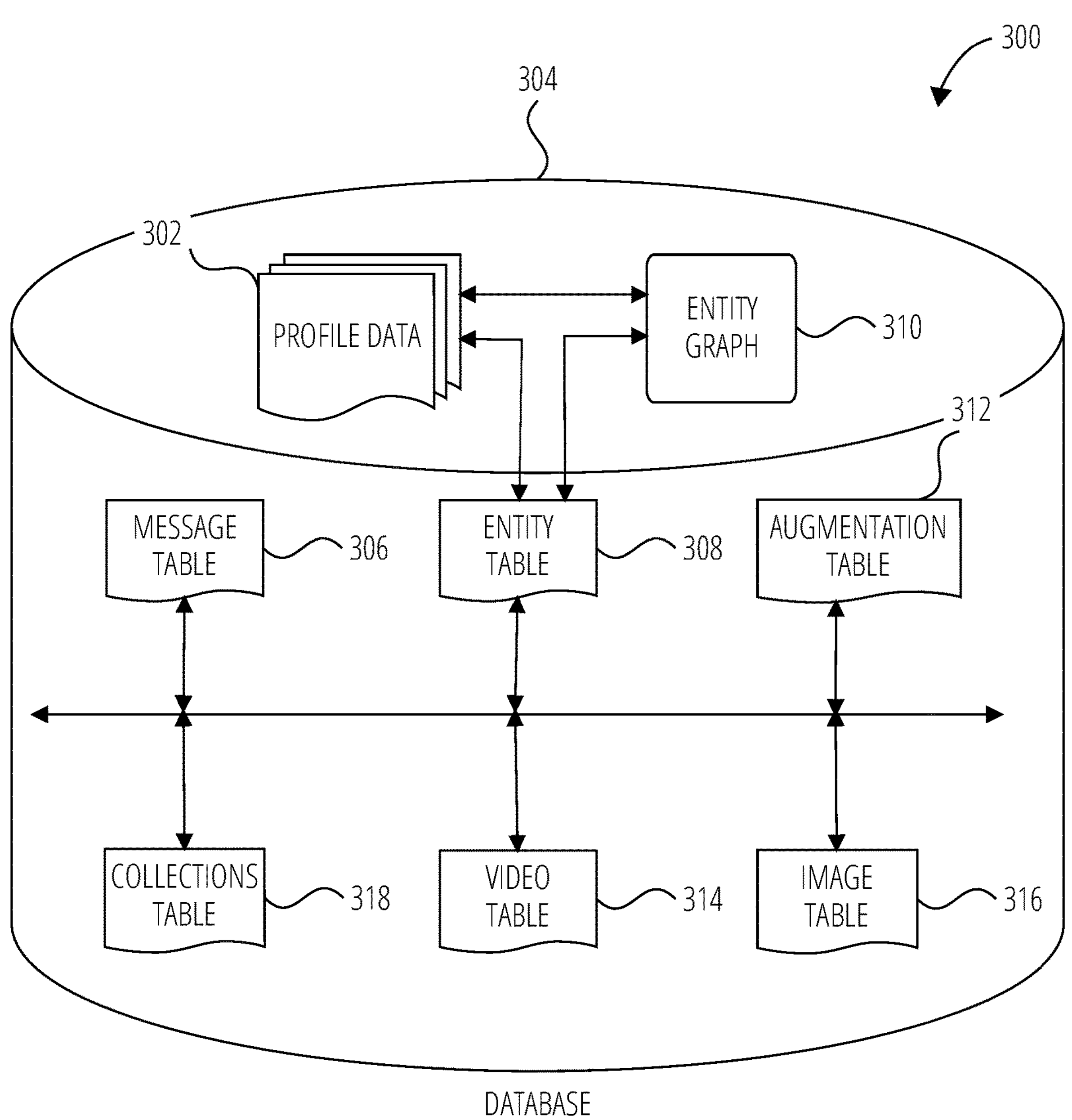
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include a media database 402, a vocal track storage 408, and a viseme-timestamp database 412 as described below with reference to FIG. 4.

Figure 4:
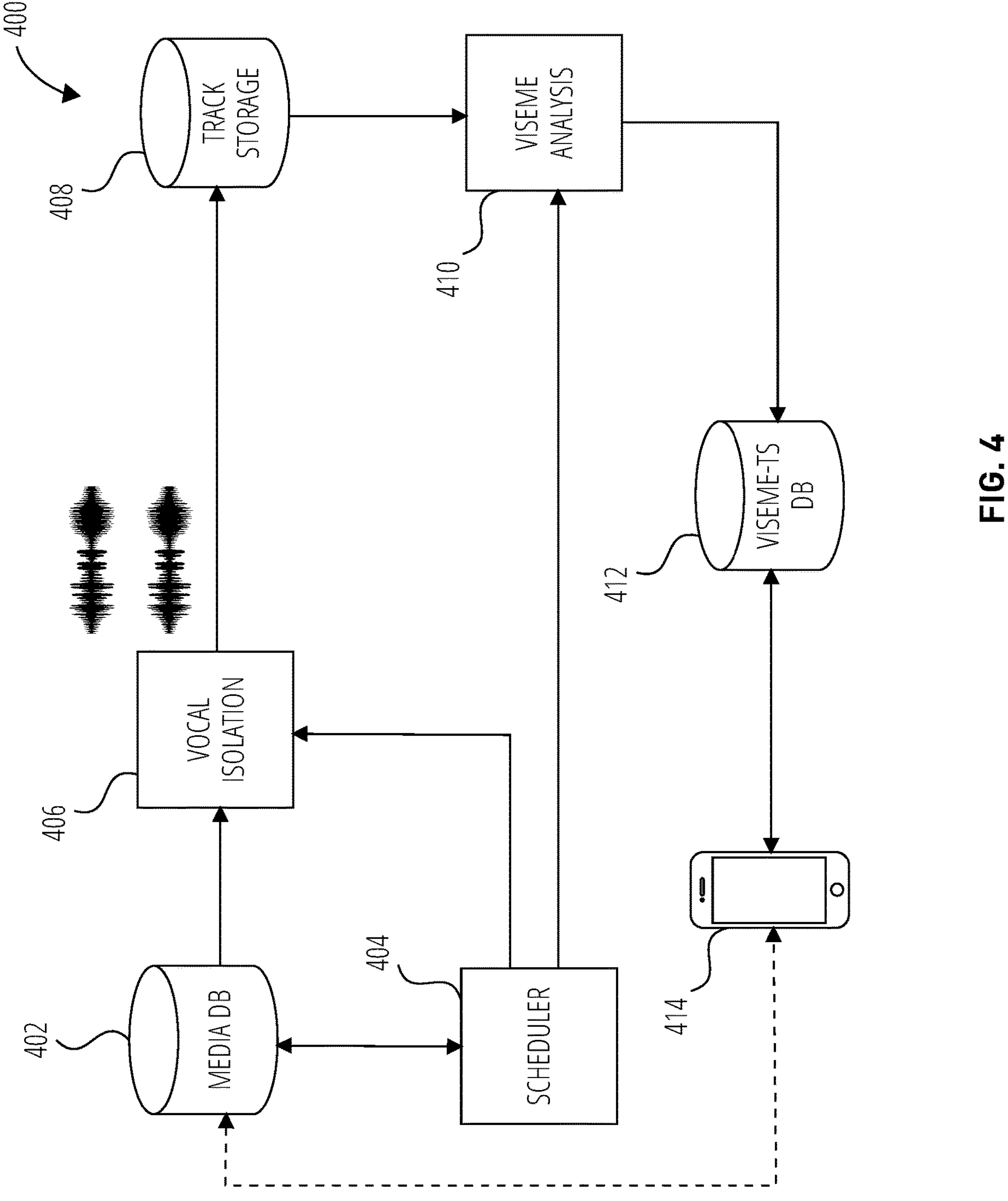
FIG. 4 illustrates a system for enabling lip-synching, according to some examples.

FIG. 4 illustrates a system 400 for enabling lip-synching, according to some examples. The system 400 includes a media database 402, a scheduler 404, a vocal isolation component 406, vocal track storage 408, and a viseme analysis component 410. The system 400 is accessed by and provides relevant information to a user device 414.

The media database 402 comprises a collection of media items that includes audio with at least one vocal track. In some examples, the media database 402 includes a collection of songs in audio format, but music videos or other media having an audio track, can be included in the collection. The media database 402 is accessed by the scheduler 404 and provides media data to the vocal isolation component 406 and, optionally, the user device 414.

The scheduler 404 allocates media items to the vocal isolation component 406 for processing based on available processor capability and song popularity. Since vocal isolation is processor intensive, more popular songs are processed first. The vocal isolation component 406, in some examples, comprises a pre-trained neural network such as a convolutional neural network (CNN) using a U-Net architecture. The neural network of the vocal isolation component 406 is trained on tens of thousands of musical tracks with corresponding isolated stems (individual instrument or vocal tracks) across a range of genres.

Based on this training, the neural network of the vocal isolation component 406 can map an inputted mixed audio signal to an output signal for each specific source (e.g., vocals, drums). In some examples, vocal track output signals can include two vocal parts of a duet, or vocal tracks corresponding to a lead singer and backup vocals. A U-Net architecture can also be used to generate phonemes from vocal audio or raw music waveforms. This is similar to how it works for image segmentation, but instead of segmenting spatial pixels, it segments temporal sequences.

In use, the vocal isolation component 406 processes an input audio track to provide an output that consists of multiple stems, each corresponding to a different source in the audio mix. For example, there may be stems for vocals, drums, bass, and other instruments. The vocal stems are stored as vocal tracks in vocal track storage 408, along with information identifying the audio track from which the vocal tracks have been obtained. In some examples, the vocal isolation component 406 also provides a likely gender or age of the vocalist for a particular track.

The vocal tracks for a particular audio track are then provided to the viseme analysis component 410, which generates a list of viseme identifiers for each vocal audio track, including time-stamps identifying where in the audio track each individual viseme is found.

The viseme analysis component 410 includes a trained acoustic machine learning model, which represents the relationship between phonemes (basic speech sounds) and audio features. The acoustic model is trained using a large dataset of audio recordings and their corresponding transcriptions. This training process configures the acoustic model so that it can identify the acoustic characteristics of different phonemes.

In some examples, the acoustic model uses Gaussian Mixture Models (GMMs) to represent the probability distribution of acoustic features for each phonetic unit. GMMs are statistical models that assume that the data is generated by a mixture of several Gaussian distributions. Each Gaussian component in the mixture represents a different state of a hidden Markov model (HMM), which is used to model the temporal dependencies in speech.

The acoustic model is trained using a large dataset of audio recordings along with their corresponding transcriptions. The training process involves estimating the parameters of the GMMs for each phonetic unit. The dataset used for training is diverse and representative of the target application's domain to ensure that model generalizes well to different speakers/singers and speaking/singing styles.

Feature extraction is performed on the vocal tracks to represent the essential characteristics of the sound. Commonly used features include Mel-Frequency Cepstral Coefficients (MFCCs) and delta coefficients. These features describe the spectral content of the audio signal and capture information relevant to speech recognition, which are used by the acoustic model to determine which phenome corresponds to which feature. In some examples, viseme analysis component 410 uses triphone models, which consider the context of a phoneme in terms of the preceding and following phonemes. This helps improve the accuracy of the model, especially in recognizing coarticulation effects where the pronunciation of a phoneme is influenced by its neighboring phonemes.

Each phoneme is associated with a specific facial expression or lip shape, i.e., viseme. The mapping from phoneme to viseme is predefined based on the expected visual appearance of the mouth and face while pronouncing each phoneme. The viseme analysis component 410 converts a list of timestamps and phonemes to a list of timestamps and viseme identifiers based on this mapping. The list of timestamps and viseme identifiers, together with information identifying the original media item, is provided to the viseme-timestamp database 412. As used herein and depending on the context, the term viseme refers to both the concept of a person's mouth having a particular shape when uttering a particular phoneme, as well as to a representation of a mouth shape that corresponds to a particular phoneme as discussed in the next paragraph.

Also included in a database 128 of the interaction system 100, or stored locally in the user device 414, are different sets of visemes as represented by different mouth styles. The styles could be cartoonish, realistic, two or three dimensional, generated from an image of a particular user or other person's mouth, or generated as a manipulation of a mesh corresponding to the user's mouth. The visemes can for example include lipstick, facial hair, and so forth, and may include associated changes in a person's face such as jaw movement. A particular set of visemes or a particular mouth style can be selected by the user or be selected automatically, for example randomly, based on audio track metadata, or other contextual information.

Figure 5A:
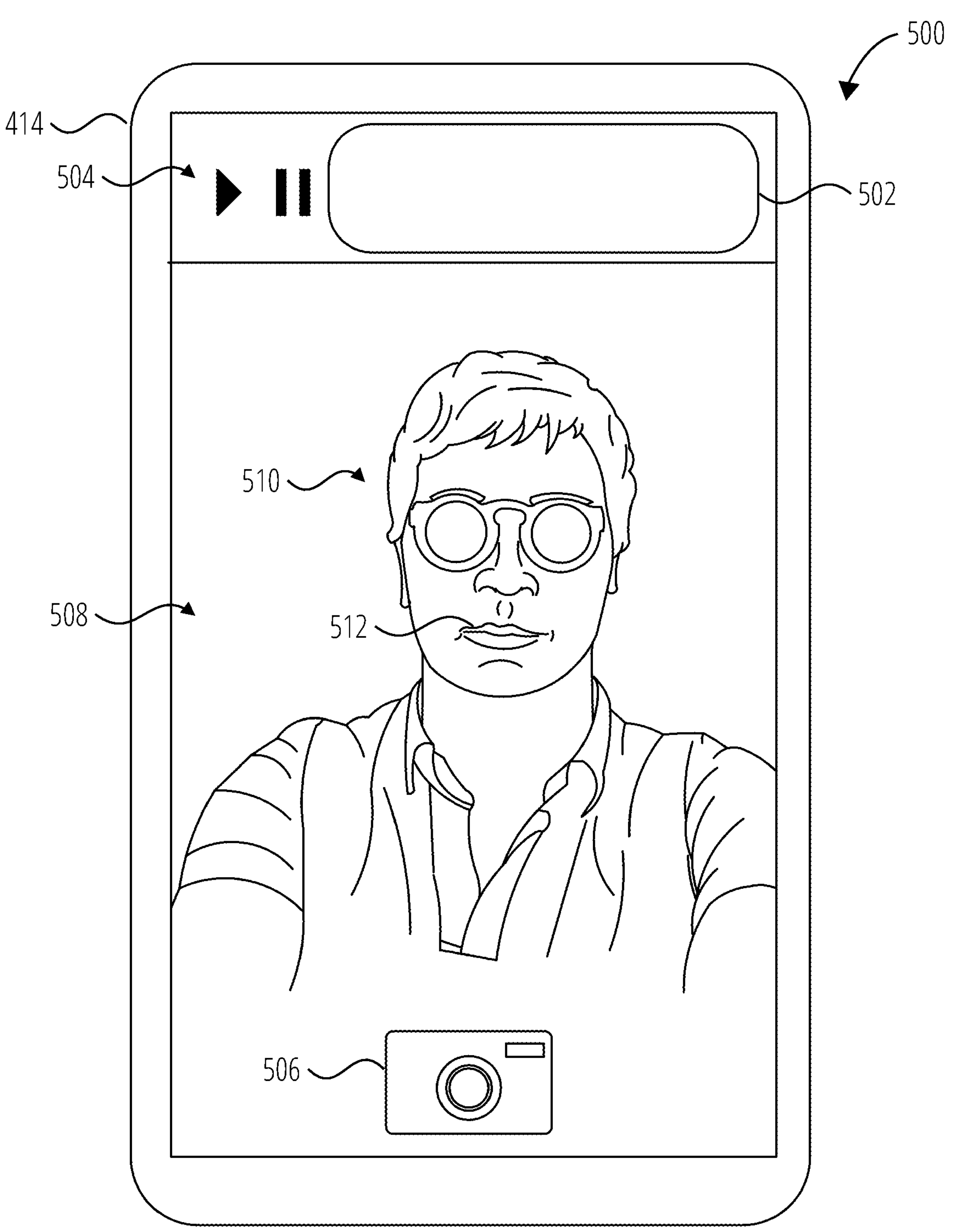
FIG. 5A illustrates a user interface for use with lip-synching, according to some examples.

FIG. 5A illustrates a user interface 500 for use with lip-synching, according to some examples. In use, a person operating the user device 414 opens an application, such as interaction client 104 or application 106, that includes the lip-synching function, or selects the lip-synching function from options provided in an application. User selection of an audio track is received from the user via track selection and information interface 502. In some examples, a tap on the selection and information interface 502 will open a search or browsing window for track selection as is known. Once a track is selected, track bibliographic information is shown in selection and information interface 502. If the audio track is not stored locally, it is obtained (downloaded or queued for streaming) from a remote database server 126 such as media database 402. The corresponding viseme-timestamp file is then obtained from the viseme-timestamp database 412.

A video feed 508 captured by a front or rear camera on the user device 414 is shown on the display screen of the user device 414. In the illustrated example, the video feed 508 includes a face 510 with a mouth 512. The application running on user device 414 extracts facial features from the video feed 508 using various computer vision techniques and facial recognition algorithms. Extracting facial features involves identifying and capturing information about key elements of a person's face, such as eyes, nose, mouth, and overall facial structure.

Face detection is the initial step in facial feature extraction. Algorithms like Haar cascades, Histogram of Oriented Gradients (HOG), or deep learning-based methods (e.g., using a pre-trained Convolutional Neural Network like MTCNN or OpenCV's DNN module with a deep learning framework) can be employed to locate faces within an image or video frame.

The application then performs facial landmark detection, which involves identifying specific points on a face, such as the corners of the eyes, the tip of the nose, and the corners of the mouth. Algorithms like shape predictors (e.g., dlib's shape predictor) or deep learning-based methods (e.g., using facial landmark detection models like FaceNet or OpenFace) can be used for this task. Once facial landmarks are detected, various features can be extracted based on their positions and relationships. Commonly extracted features include distances between landmarks, angles formed by facial components, and ratios between different measurements.

In some examples, 2D facial feature extraction is performed, while in other examples 3D facial recognition techniques are used that determine depth information. This can be achieved using known techniques that estimate 3D facial geometry from 2D images, in which case a mesh is generated representing the shape and location of the user's face and its features. Facial feature extraction continues while the lip-synching method is executing.

Figure 5B:
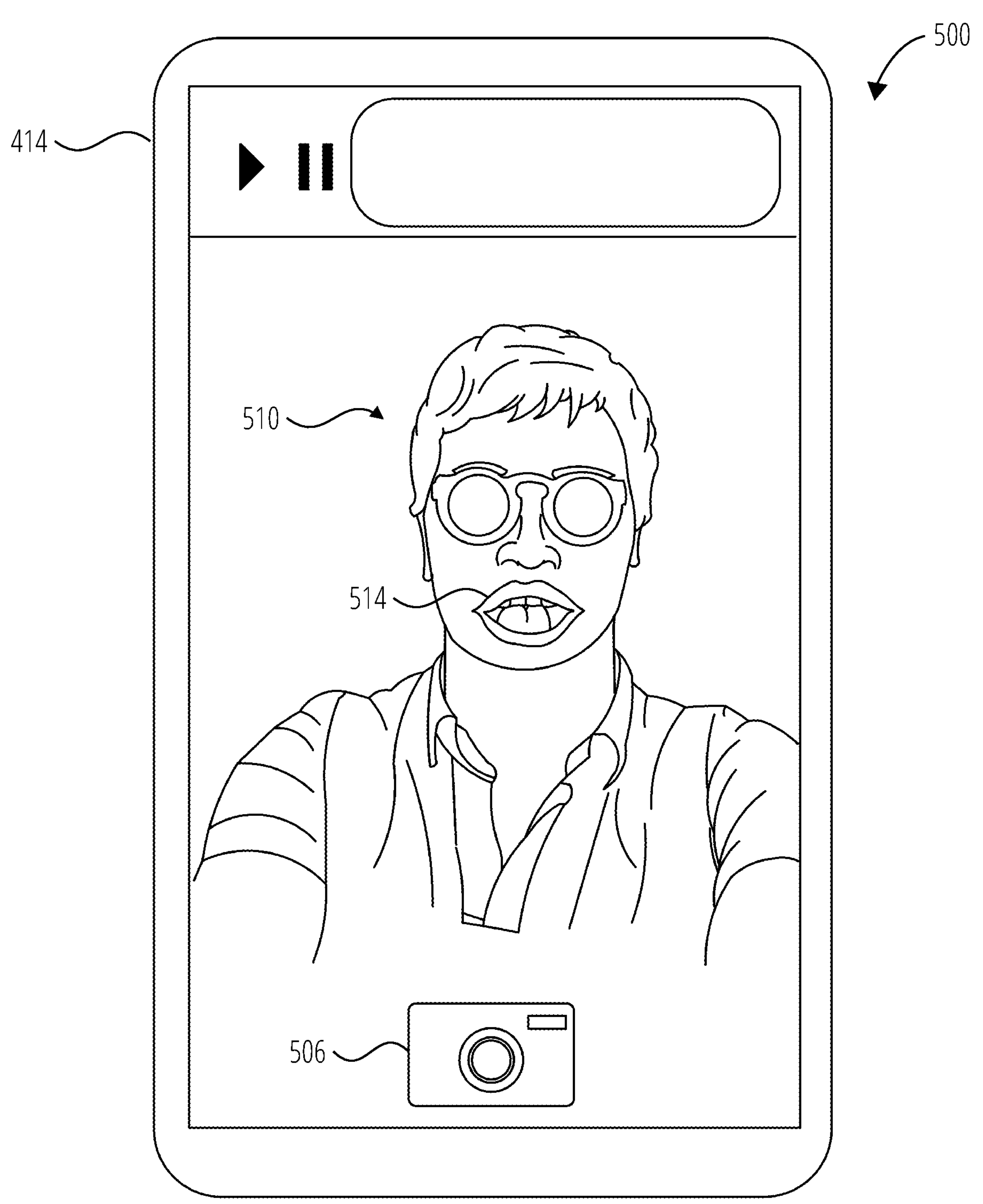
FIG. 5B illustrates an aspect of the subject matter in accordance with one embodiment.

Upon receipt of user input to play the audio track, the application begins rendering the audio, which could be through speakers incorporated in the user device 414, ear-buds, or other associated speakers. The application uses the current timestamp of the audio track to retrieve a corresponding viseme identifier from the viseme-timestamp file for the audio track, retrieves the corresponding viseme from the set of visemes that has been selected by the user or automatically by the application, and applies it to the face 510 represented in the video feed 508, to provide the first instance of an animated mouth 514 as seen in FIG. 5B.

Positioning of the viseme is performed based on the location of relevant features that have been detected, such as the locations of corners of the mouth 512 of the face 510. The viseme is scaled based on the distance between the locations of the corners of the mouth 512, and applied to the video feed 508 with locations of features of the mouths 512 corresponding to locations of features of the particular viseme. In some examples, the particular viseme is rotated in the plane of the display screen to account for any left or right tilting of the user's head, to position the viseme at an angle of rotation or along a line between the two corners of the mouth 512 depicted in the video feed 508, without scaling it based on the distance between the locations of the mouth 512. This prevents rescaling from occurring based on movements of the user's mouth that are not consistent with the lyrics of the audio track. In such a case, the center of the viseme is positioned on a center of the mouth 512.

In some examples, a distance that is fixed in real life, such as the distance between a user's eyes or the width of the user's head, can be used for scaling the viseme. Then, when the user moves closer or further from the user device 414, the (changed) size of this fixed distance in the video feed 508 can be used to scale the viseme for placement in the video feed independent of any mouth movements made by the user.

In some examples in which a 3D mesh has been determined for the user's face, the viseme can be rotated to account for the depths of the locations of features of the face (such as the corners of the user's mouth) in the video feed, with a corresponding scaling and projection of the appearance of the viseme.

As the audio track continues playing, the current audio timestamp will be checked against the timestamp in the viseme-timestamp file to determine whether the viseme identifier has changed from the current/previous viseme identifier. If so, the application retrieves the corresponding viseme from the set of visemes and positions it over the mouth of the face as described above. In some examples, known image processing techniques such as "morphing" between the two visemes are performed to provide a smoother transition between the visemes. Checking against the audio timestamp, updating the viseme as needed, and repositioning the viseme as needed continue until the audio track has finished playing or user input terminating or pausing the playback is received.

In some examples, the vocal isolation component 406 will isolate more than one vocal track, such as the two vocal parts of a duet, or a vocal track corresponding to a lead singer and backup vocals. The viseme-timestamp file corresponding to the lead vocal is processed when only a single face is captured in the video feed 508. If two or more viseme-timestamp files are present for an audio track, or the viseme-timestamp file for an audio track includes two or more sets of viseme-timestamp data, each corresponding to a different vocal track, the visemes corresponding to the lead vocal is selected if only one face is detected in the video feed 508.

If two files or sets of viseme-timestamp data corresponding to different vocal tracks are present, and the application detects two faces in the video feed 508, different schemes can be used for assigning a vocal track to a face. For example, the lead vocal track could be assigned to the largest/larger face (or largest/larger mouth) in the video, either initially when the video starts, or updated periodically. In other examples, the vocal tracks can be assigned randomly to detected mouths, or based on an apparent gender or age of the people represented in the video. In some examples, the assignment can follow the identified characteristics (for example, assigning a male vocal in a duet to a face with facial hair), but in other cases, the assignment can be deliberately incorrect for comedic effect, such as assigning a female vocal to a face with facial hair.

If more than one face is present and more than one vocal track is present, the methods described herein for animating a single face are performed in parallel for each face and each corresponding vocal track.

Figure 6:
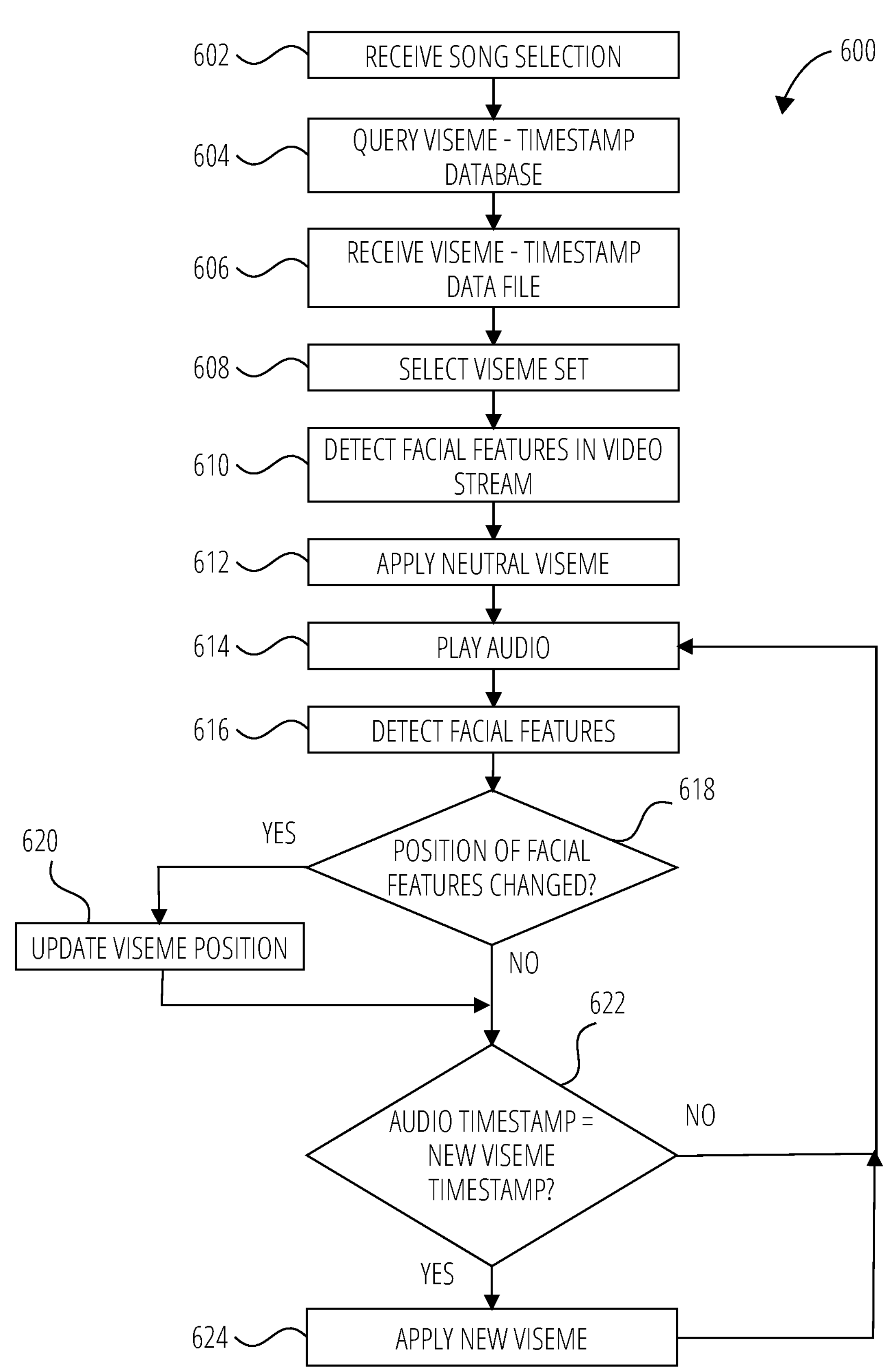
FIG. 6 is a flowchart illustrating a lip-synching method, according to some examples.

FIG. 6 is a flowchart illustrating a lip-synching method, according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations.

Operations illustrated in FIG. 6 will typically execute on the user device 414 (user system 102). For the purposes of clarity, flowchart 600 is discussed herein with reference to such an example. Various implementations are of course possible, with some of the operations taking place in interaction server system 110, or with one application calling another application or SDK for required functionality.

The flowchart 600 commences in operation 602 with receipt by the application of user input selecting a song. The viseme-timestamp database 412 is queried in operation 604 using the selected song's bibliographic or other identifying information, and a viseme-timestamp file corresponding to the selected song is received from the viseme-timestamp database 412 by the application in operation 606. A set of visemes for use with the song is selected in operation 608, either by user or by the application as discussed in more detail above.

Facial features and their locations are then detected by the application in operation 610, as described above, and a neutral viseme, representing a lack of a phoneme (that is, silence) is applied to the face 510 at the location of the mouth 512. User input to begin playing the song is received, and the application begins playing the audio in operation 614.

The application detects facial features and their locations in the video feed in operation 616. In operation 618, the application determines whether the location in the video stream of the detected mouth 512 has changed or is changing. If so, the application updates the display position of the viseme in operation 620 and proceeds to operation 622. If the application has determined that the position of facial features has not changed in operation 618, the method proceeds to directly to operation 622.

The application then compares the current timestamp of the song to the viseme-timestamp file to determine if that timestamp corresponds to a new viseme identifier. If not, the method returns to operation 614 and proceeds from there. If so, the new viseme is applied to the video feed 508 at the current position in operation 624. The method then returns to operation 614 and proceeds from there.

Machine-Learning Pipeline

Figure 8:
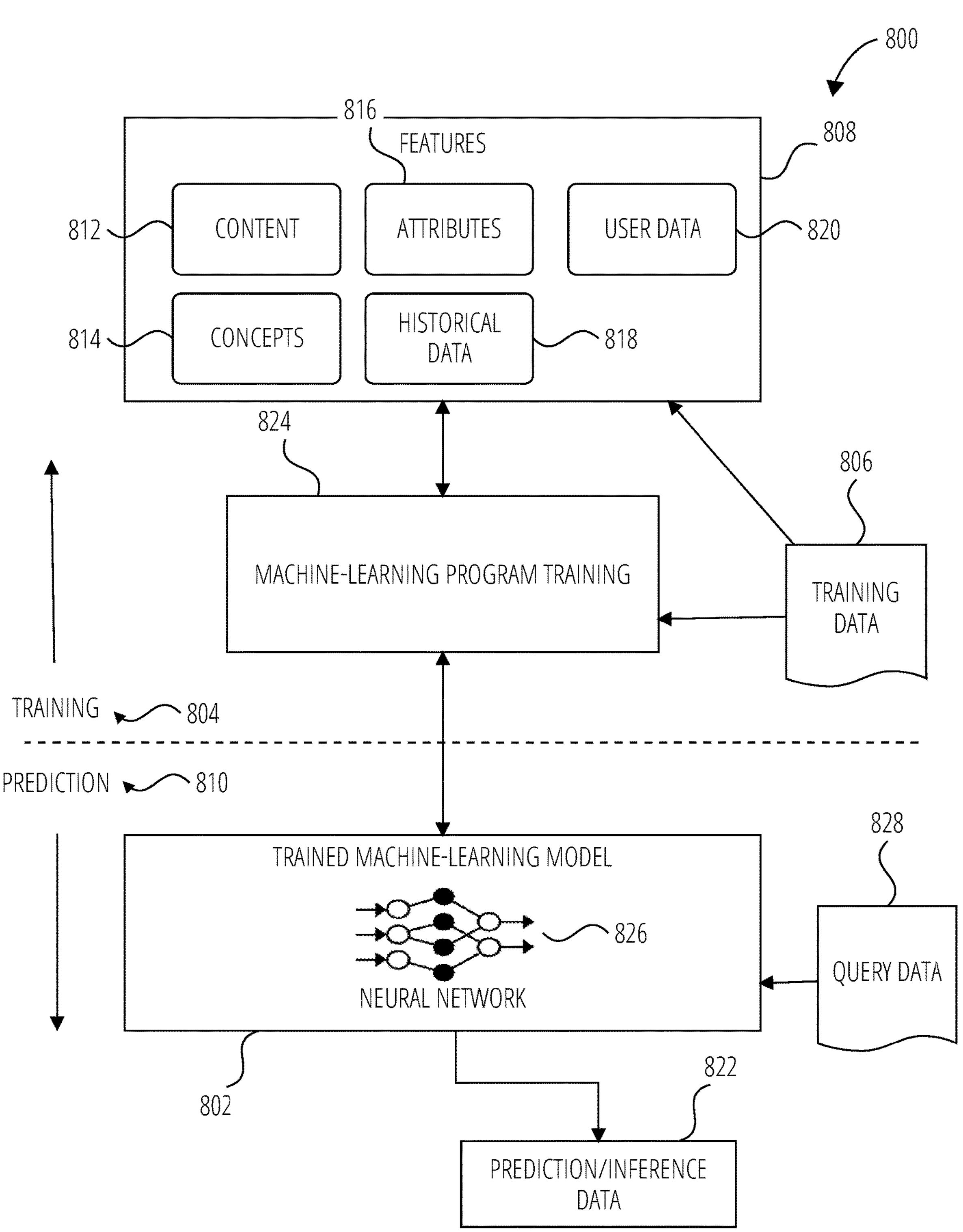
FIG. 8 illustrates training and use of a machine-learning program, according to some examples.

FIG. 8 is a flowchart depicting a machine-learning pipeline 800, according to some examples. The machine-learning pipeline 800 may be used to generate a trained machine-learning model 802, for example in the vocal isolation component 406 and the viseme analysis component 410, to perform operations associated with searches and query responses.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Training Phases

Figure 7:
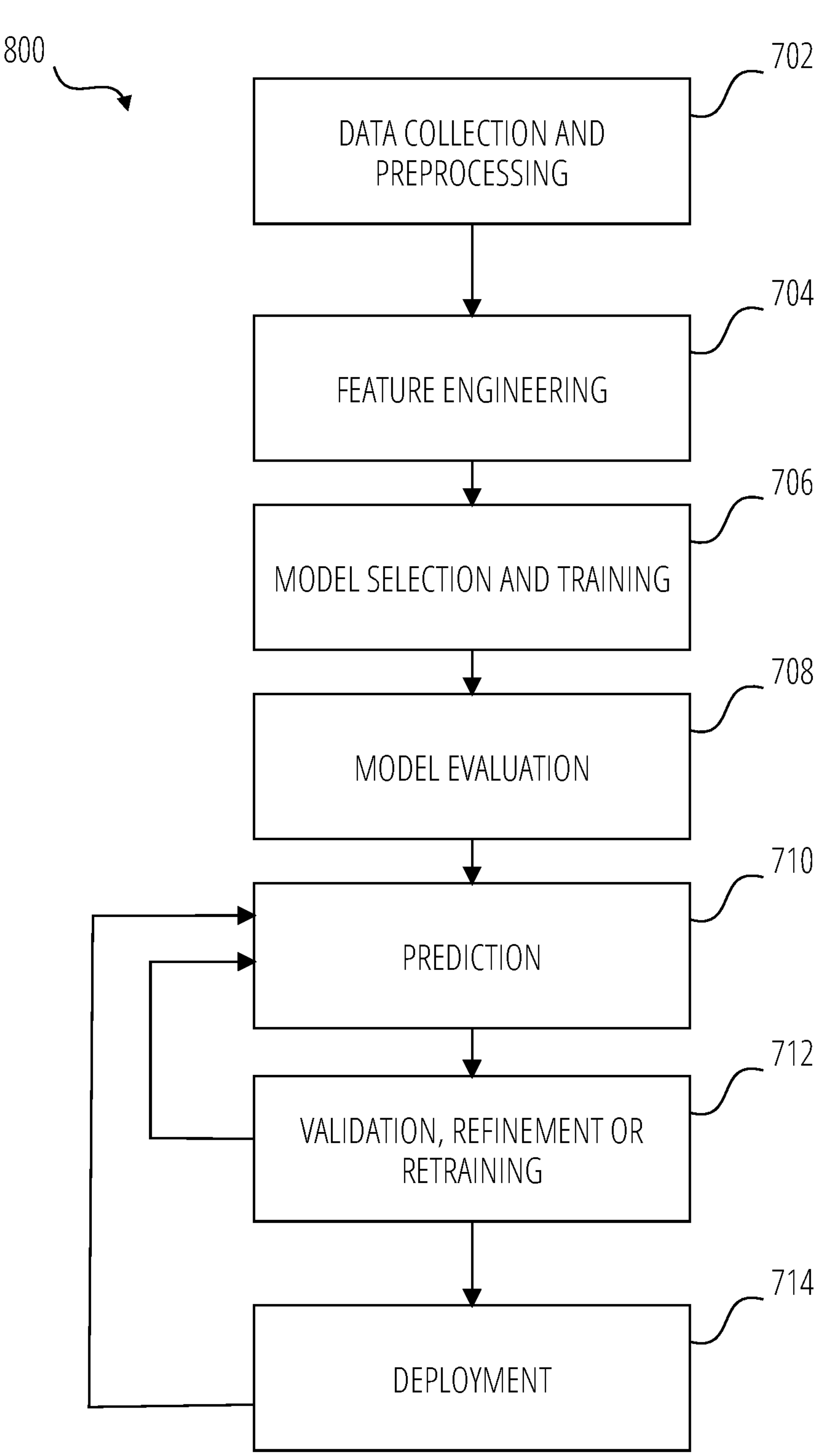
FIG. 7 illustrates a machine-learning pipeline, according to some examples.

Generating a trained machine-learning model 802 may include multiple phases that form part of the machine-learning pipeline 800, including for example the following phases illustrated in FIG. 7:

- Data collection and preprocessing 702: This phase may include acquiring and cleaning data to ensure that it is suitable for use in the machine learning model. This phase may also include removing duplicates, handling missing values, and converting data into a suitable format.
- Feature engineering 704: This phase may include selecting and transforming the training data 806 to create features that are useful for predicting the target variable. Feature engineering may include (1) receiving features 808 (e.g., as structured or labeled data in supervised learning) and/or (2) identifying features 808 (e.g., unstructured or unlabeled data for unsupervised learning) in training data 806.
- Model selection and training 706: This phase may include selecting an appropriate machine learning algorithm and training it on the preprocessed data. This phase may further involve splitting the data into training and testing sets, using cross-validation to evaluate the model, and tuning hyperparameters to improve performance.
- Model evaluation 708: This phase may include evaluating the performance of a trained model (e.g., the trained machine-learning model 802) on a separate testing dataset. This phase can help determine if the model is overfitting or underfitting and determine whether the model is suitable for deployment.
- Prediction 710: This phase involves using a trained model (e.g., trained machine-learning model 802) to generate predictions on new, unseen data.
- Validation, refinement or retraining 712: This phase may include updating a model based on feedback generated from the prediction phase, such as new data or user feedback.

Deployment 714: This phase may include integrating the trained model (e.g., the trained machine-learning model 802) into a more extensive system or application, such as a web service, mobile app, or IoT device. This phase can involve setting up APIs, building a user interface, and ensuring that the model is scalable and can handle large volumes of data.

FIG. 8 illustrates further details of two example phases, namely a training phase 804 (e.g., part of the model selection and trainings 706) and a prediction phase 810 (part of prediction 710). Prior to the training phase 804, feature engineering 704 is used to identify features 808. This may include identifying informative, discriminating, and independent features for effectively operating the trained machine-learning model 802 in pattern recognition, classification, and regression. In some examples, the training data 806 includes labeled data, known for pre-identified features 808 and one or more outcomes. Each of the features 808 may be a variable or attribute, such as an individual measurable property of a process, article, system, or phenomenon represented by a data set (e.g., the training data 806). Features 808 may also be of different types, such as numeric features, strings, and graphs, and may include one or more of content 812, concepts 814, attributes 816, historical data 818, and/or user data 820, merely for example.

In training phase 804, the machine-learning pipeline 800 uses the training data 806 to find correlations among the features 808 that affect a predicted outcome or prediction/inference data 822.

With the training data 806 and the identified features 808, the trained machine-learning model 802 is trained during the training phase 804 during machine-learning program training 824. The machine-learning program training 824 appraises values of the features 808 as they correlate to the training data 806. The result of the training is the trained machine-learning model 802 (e.g., a trained or learned model).

Further, the training phase 804 may involve machine learning, in which the training data 806 is structured (e.g., labeled during preprocessing operations). The trained machine-learning model 802 implements a neural network 826 capable of performing, for example, classification and clustering operations. In other examples, the training phase 804 may involve deep learning, in which the training data 806 is unstructured, and the trained machine-learning model 802 implements a deep neural network 826 that can perform both feature extraction and classification/clustering operations.

In some examples, a neural network 826 may be generated during the training phase 804, and implemented within the trained machine-learning model 802. The neural network 826 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 826 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 826 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 804, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 810, the trained machine-learning model 802 uses the features 808 for analyzing query data 828 to generate inferences, outcomes, or predictions, as examples of a prediction/inference data 822. For example, during prediction phase 810, the trained machine-learning model 802 generates an output. Query data 828 is provided as an input to the trained machine-learning model 802, and the trained machine-learning model 802 generates the prediction/inference data 822 as output, responsive to receipt of the query data 828.

In some examples, the trained machine-learning model 802 may be a generative AI model. Generative AI is a term that may refer to any type of artificial intelligence that can create new content from training data 806. For example, generative AI can produce text, images, video, audio, code, or synthetic data similar to the original data but not identical. In cases where the trained machine-learning model 802 is a generative AI, query data 828 may include text, audio, image, video, numeric, or media content prompts and the output prediction/inference data 822 may include text, images, video, audio, code, or synthetic data.

Some of the techniques that may be used in generative AI are:

Convolutional Neural Networks (CNNs): CNNs may be used for image recognition and computer vision tasks. CNNs may, for example, be designed to extract features from images by using filters or kernels that scan the input image and highlight important patterns.

Recurrent Neural Networks (RNNs): RNNs may be used for processing sequential data, such as speech, text, and time series data, for example. RNNs employ feedback loops that allow them to capture temporal dependencies and remember past inputs.

Generative adversarial networks (GANs): GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code.

Machine Architecture

Figure 9:
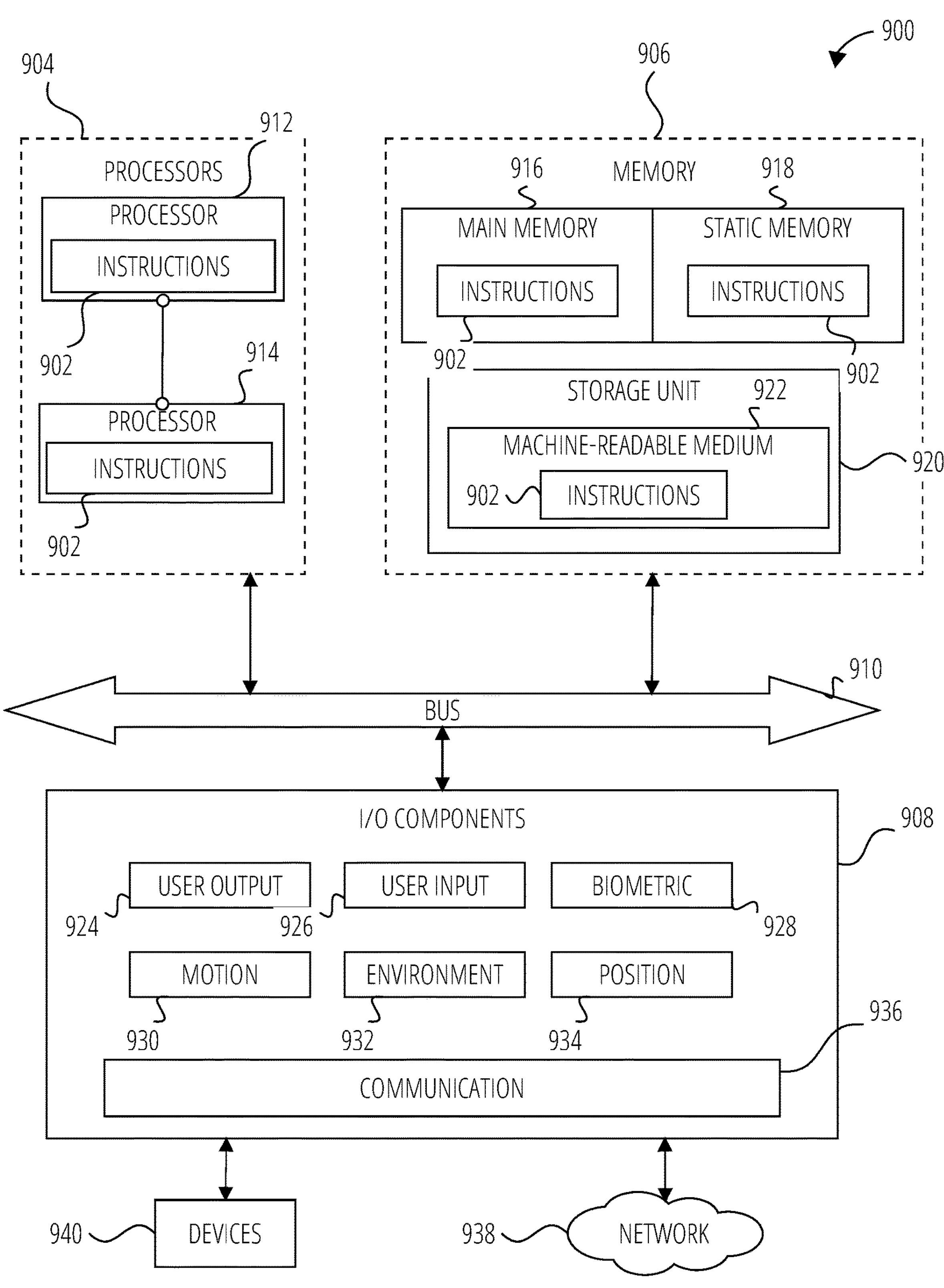
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
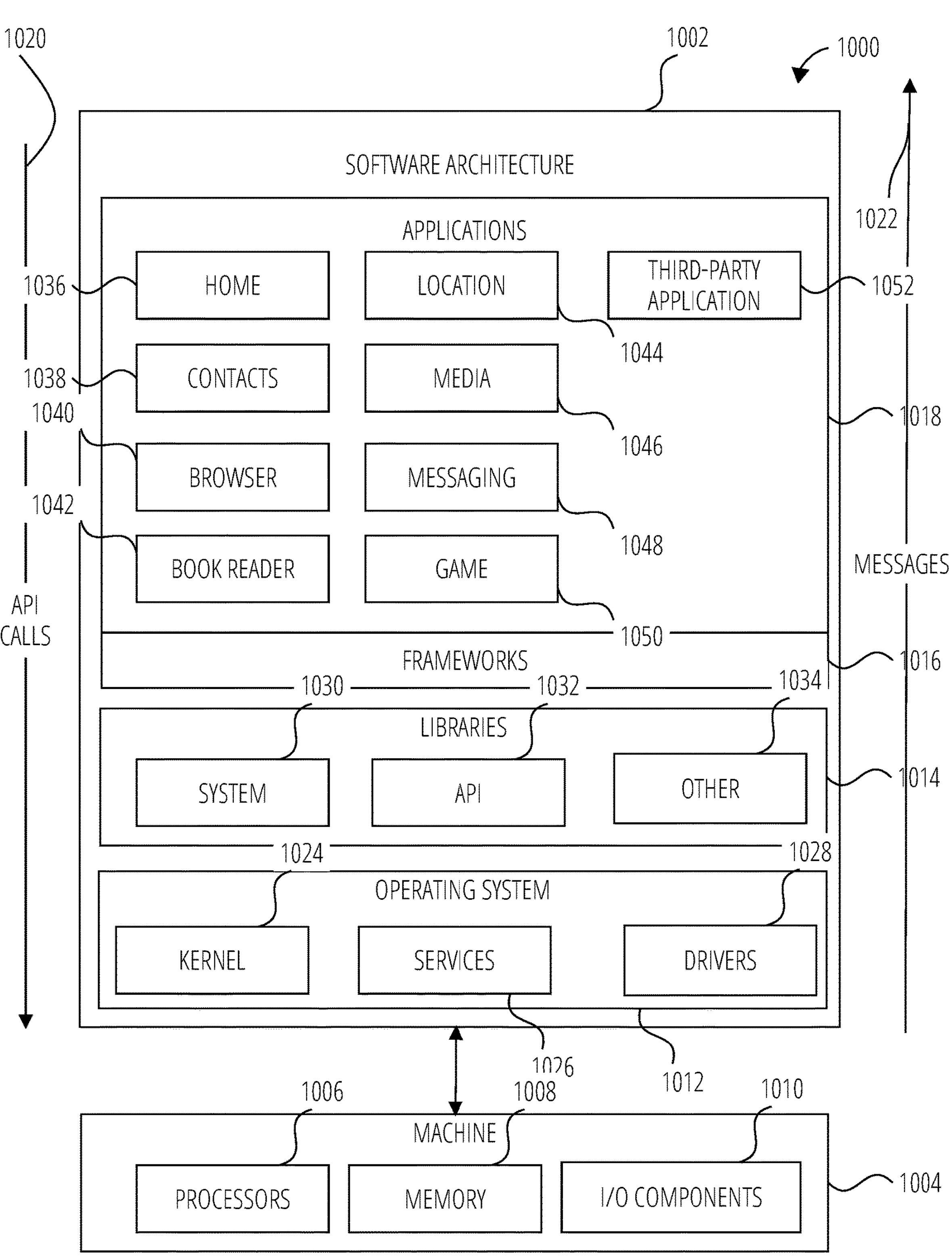
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

EXAMPLES

Various examples are contemplated. Example 1 is a system comprising: at least one processor; at least one memory component storing instructions that, when executed by the at least one processor, cause the at least one processor to perform operations comprising: playing back an audio track; detecting a location of a mouth depicted in a video feed; comparing a timestamp of playback of the audio track to viseme-timestamp data for the audio track to identify a viseme corresponding to the timestamp of the audio playback; and positioning the viseme at the detected location of the mouth in the video feed.

In Example 2, the subject matter of Example 1 includes, wherein the operations further comprise: detecting an updated location of the mouth depicted in the video feed; and positioning the viseme at the detected updated location of the mouth in the video feed.

In Example 3, the subject matter of Examples 1-2 includes, wherein the operations further comprise: comparing an updated timestamp of the playback of the audio track to the viseme-timestamp data for the audio track to identify an updated viseme corresponding to the timestamp of the audio playback; and positioning the updated viseme at the detected location of the mouth in the video feed.

In Example 4, the subject matter of Examples 1-3 includes, wherein the detection of the location of the mouth in the video feed comprises detecting corners of the mouth in the video feed, and wherein positioning the viseme at the detected location of the mouth in the video feed comprises positioning corners of a mouth depicted in the viseme at the corners of the mouth in the video feed.

In Example 5, the subject matter of Examples 1~4 includes, wherein the detection of the location of the mouth in the video feed comprises detecting an angle of the mouth in the video feed, and wherein positioning the viseme at the detected location of the mouth in the video feed comprises rotating the viseme by the detected angle.

In Example 6, the subject matter of Examples 1-5 includes, wherein the operations further comprise: scaling the viseme based on a characteristic dimension of a head detected in the video feed.

In Example 7, the subject matter of Examples 1-6 includes, wherein viseme-timestamp data comprises first and second sets of viseme-timestamps for two vocal tracks, and wherein the operations further comprise: detecting first and second mouths in the video feed; positioning a first viseme at a location of the first mouth in the video feed based on the first set of viseme-timestamps; and positioning a second viseme at a location of the second mouth in the video feed based on the second set of viseme-timestamps.

In Example 8, the subject matter of Example 7 includes, wherein the first set of viseme-timestamps corresponds to a lead vocal and the first mouth is larger in the video feed than the second mouth.

In Example 9, the subject matter of Examples 7-8 includes, wherein assignment of the first set of viseme-timestamps to a mouth is done randomly.

Example 10 is a method, executed by one or more processors, the method comprising: playing back an audio track; detecting a location of a mouth depicted in a video feed; comparing a timestamp of playback of the audio track to viseme-timestamp data for the audio track to identify a viseme corresponding to the timestamp of the audio playback; and positioning the viseme at the detected location of the mouth in the video feed.

In Example 11, the subject matter of Example 10 includes, detecting an updated location of the mouth depicted in the video feed; and positioning the viseme at the detected updated location of the mouth in the video feed.

In Example 12, the subject matter of Examples 10-11 includes, comparing an updated timestamp of the playback of the audio track to the viseme-timestamp data for the audio track to identify an updated viseme corresponding to the timestamp of the audio playback; and positioning the updated viseme at the detected location of the mouth in the video feed.

In Example 13, the subject matter of Examples 10-12 includes, wherein viseme-timestamp data comprises first and second sets of viseme-timestamps for two vocal tracks, the method further comprising: detecting first and second mouths in the video feed; positioning a first viseme at a location of the first mouth in the video feed based on the first set of viseme-timestamps; and positioning a second viseme at a location of the second mouth in the video feed based on the second set of viseme-timestamps.

In Example 14, the subject matter of Example 13 includes, wherein the first set of viseme-timestamps corresponds to a lead vocal and the first mouth is larger in the video feed than the second mouth.

In Example 15, the subject matter of Examples 13-14 includes, wherein assignment of the first set of viseme-timestamps to a mouth is done randomly.

Example 16 is a non-transitory computer-readable storage medium storing instructions that, when executed by at least one processor, cause the at least one processor to perform operations comprising: playing back an audio track; detecting a location of a mouth depicted in a video feed; comparing a timestamp of playback of the audio track to viseme-timestamp data for the audio track to identify a viseme corresponding to the timestamp of the audio playback; and positioning the viseme at the detected location of the mouth in the video feed.

In Example 17, the subject matter of Example 16 includes, wherein the detection of the location of the mouth in the video feed comprises detecting an angle of the mouth in the video feed, and wherein positioning the viseme at the detected location of the mouth in the video feed comprises rotating the viseme by the detected angle.

In Example 18, the subject matter of Examples 16-17 includes, wherein the operations further comprise: scaling the viseme based on a characteristic dimension of a head detected in the video feed.

In Example 19, the subject matter of Examples 16-18 includes, wherein viseme-timestamp data comprises first and second sets of viseme-timestamps for two vocal tracks, and wherein the operations further comprise: detecting first and second mouths in the video feed; positioning a first viseme at a location of the first mouth in the video feed based on the first set of viseme-timestamps; and positioning a second viseme at a location of the second mouth in the video feed based on the second set of viseme-timestamps.

In Example 20, the subject matter of Example 19 includes, wherein assignment of the first set of viseme-timestamps to a mouth is done randomly.

Example 21 is a method of processing audio tracks, performed by one or more processors, comprising: retrieving an audio track from a database of audio tracks; extracting a vocal track from the audio track; analyzing the vocal track to determine visemes corresponding to lyrics at corresponding time locations in the audio track; and saving a file of viseme-timestamp data comprising viseme identifiers corresponding to the determined visemes and the corresponding time locations in the audio track.

In Example 22, the subject matter of Example 21 includes, wherein the vocal track is extracted using a pre-trained neural network trained on a database of musical tracks with one or more corresponding isolated vocal tracks across a range of genres.

In Example 23, the subject matter of Examples 21-22 includes, wherein the analyzing of the vocal track is at least partly performed by a trained audio machine learning model, which determines phonemes corresponding to audio features in the vocal track.

In Example 24, the subject matter of Example 23 includes, wherein the trained audio machine learning model is trained using a large dataset of audio recordings and their corresponding phoneme transcriptions.

In Example 25, the subject matter of Examples 23-24 includes, wherein the analyzing of the vocal track further comprises mapping determined phonemes to corresponding visemes.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25. Example 28 is a system to implement of any of Examples 1-25.

Example 29 is a method to implement of any of Examples 1-25.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:

at least one processor;

at least one memory component storing instructions that, when executed by the at least one processor, cause the at least one processor to perform operations comprising:

playing back an audio track;

detecting a location of a mouth depicted in a video feed captured by a camera of the system;

comparing a timestamp of playback of the audio track to viseme-timestamp data for the audio track to identify a viseme corresponding to the timestamp of the audio playback;

scaling the viseme based on a distance between two facial features detected in the video feed, the distance between the two facial features being fixed in real life, thereby to decouple a size of the viseme from a size of the mouth depicted in the video feed; and positioning the viseme at the detected location of the mouth in the video feed.

2. The system of claim 1, wherein the operations further comprise:

detecting an updated location of the mouth depicted in the video feed; and positioning the viseme at the detected updated location of the mouth in the video feed.

3. The system of claim 1, wherein the operations further comprise:

comparing an updated timestamp of the playback of the audio track to the viseme-timestamp data for the audio track to identify an updated viseme corresponding to the updated timestamp of the audio playback; and positioning the updated viseme at the detected location of the mouth in the video feed.

4. The system of claim 1, wherein the detection of the location of the mouth in the video feed comprises detecting corners of the mouth in the video feed, and wherein positioning the viseme at the detected location of the mouth in the video feed comprises positioning corners of a mouth depicted in the viseme along a line between the corners of the mouth in the video feed.

5. The system of claim 1, wherein the detection of the location of the mouth in the video feed comprises detecting an angle of the mouth in the video feed, and wherein positioning the viseme at the detected location of the mouth in the video feed comprises rotating the viseme by the detected angle.

6. The system of claim 1, wherein the operations further comprise:

receiving user selection of a set of visemes from a plurality of available sets of visemes, each available set of visemes having a different visual style; and retrieving the viseme from the set of visemes indicated by the user selection.

7. The system of claim 1, wherein the viseme-timestamp data comprises first and second sets of viseme-timestamps for two vocal tracks, and wherein the operations further comprise:

detecting first and second mouths in the video feed;

positioning a first viseme at a location of the first mouth in the video feed based on the first set of viseme-timestamps; and positioning a second viseme at a location of the second mouth in the video feed based on the second set of viseme-timestamps.

8. The system of claim 7, wherein the first set of viseme-timestamps corresponds to a lead vocal and the first mouth is larger in the video feed than the second mouth.

9. The system of claim 7, wherein assignment of the first set of viseme-timestamps to a mouth is done randomly.

10. A method, executed by one or more processors, the method comprising:

playing back an audio track;

detecting a location of a mouth depicted in a video feed captured by a camera;

comparing a timestamp of playback of the audio track to viseme-timestamp data for the audio track to identify a viseme corresponding to the timestamp of the audio playback;

scaling the viseme based on a distance between two facial features detected in the video feed, the distance between the two facial features being fixed in real life, thereby to decouple a size of the viseme from a size of the mouth depicted in the video feed; and positioning the viseme at the detected location of the mouth in the video feed.

11. The method of claim 10, further comprising:

detecting an updated location of the mouth depicted in the video feed; and positioning the viseme at the detected updated location of the mouth in the video feed.

12. The method of claim 10, further comprising:

comparing an updated timestamp of the playback of the audio track to the viseme-timestamp data for the audio track to identify an updated viseme corresponding to the updated timestamp of the audio playback; and positioning the updated viseme at the detected location of the mouth in the video feed.

13. The method of claim 10, wherein the viseme-timestamp data comprises first and second sets of viseme-timestamps for two vocal tracks, the method further comprising:

detecting first and second mouths in the video feed;

positioning a first viseme at a location of the first mouth in the video feed based on the first set of viseme-timestamps; and positioning a second viseme at a location of the second mouth in the video feed based on the second set of viseme-timestamps.

14. The method of claim 13, wherein the first set of viseme-timestamps corresponds to a lead vocal and the first mouth is larger in the video feed than the second mouth.

15. The method of claim 13, wherein assignment of the first set of viseme-timestamps to a mouth is done randomly.

16. A non-transitory computer-readable storage medium storing instructions that, when executed by at least one processor, cause the at least one processor to perform operations comprising:

playing back an audio track;

detecting a location of a mouth depicted in a video feed captured by a camera;

comparing a timestamp of playback of the audio track to viseme-timestamp data for the audio track to identify a viseme corresponding to the timestamp of the audio playback;

scaling the viseme based on a distance between two facial features detected in the video feed, the distance between the two facial features being fixed in real life, thereby to decouple a size of the viseme from a size of the mouth depicted in the video feed; and positioning the viseme at the detected location of the mouth in the video feed.

17. The non-transitory computer-readable storage medium of claim 16, wherein the detection of the location of the mouth in the video feed comprises detecting an angle of the mouth in the video feed, and wherein positioning the viseme at the detected location of the mouth in the video feed comprises rotating the viseme by the detected angle.

18. The non-transitory computer-readable storage medium of claim 16, wherein the detection of the location of the mouth in the video feed comprises detecting corners of the mouth in the video feed, and wherein positioning the viseme at the detected location of the mouth in the video feed comprises positioning corners of a mouth depicted in the viseme along a line between the corners of the mouth in the video feed.

19. The non-transitory computer-readable storage medium of claim 16, wherein the viseme-timestamp data comprises first and second sets of viseme-timestamps for two vocal tracks, and wherein the operations further comprise:

detecting first and second mouths in the video feed;

positioning a first viseme at a location of the first mouth in the video feed based on the first set of viseme-timestamps; and positioning a second viseme at a location of the second mouth in the video feed based on the second set of viseme-timestamps.

20. The non-transitory computer-readable storage medium of claim 19, wherein assignment of the first set of viseme-timestamps to a mouth is done randomly.

* * * * *